US010434541B2

(12) United States Patent
Wu et al.

(10) Patent No.: US 10,434,541 B2
(45) Date of Patent: Oct. 8, 2019

(54) FINISHING METHOD FOR A METAL SURFACE

(71) Applicant: HEWLETT-PACKARD DEVELOPMENT COMPANY, L.P., Houston, TX (US)

(72) Inventors: Kuan-Ting Wu, Taipei (TW); Chung-Hung Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 332 days.

(21) Appl. No.: 15/031,611

(22) PCT Filed: Feb. 18, 2014

(86) PCT No.: PCT/US2014/016964
§ 371 (c)(1),
(2) Date: Apr. 22, 2016

(87) PCT Pub. No.: WO2015/126370
PCT Pub. Date: Aug. 27, 2015

(65) Prior Publication Data
US 2017/0120292 A1 May 4, 2017

(51) Int. Cl.
*B05D 5/06* (2006.01)
*B05D 7/00* (2006.01)
(Continued)

(52) U.S. Cl.
CPC ............... *B05D 5/067* (2013.01); *B05D 1/36* (2013.01); *B05D 5/06* (2013.01); *B05D 7/53* (2013.01);
(Continued)

(58) Field of Classification Search
None
See application file for complete search history.

(56) References Cited

U.S. PATENT DOCUMENTS 5,919,532 A * 7/1999 Sato .................. G02F 1/133516
349/106
7,972,533 B2 7/2011 Jaworowski et al.
(Continued)

FOREIGN PATENT DOCUMENTS

CN 1931448 A 3/2007
KR 10-2001-0011974 2/2011
(Continued)

OTHER PUBLICATIONS

"Designed for High Performance—Engineered for Success", <http://www.bayercoatings.de/BMS/DB-RSC/BMS_RSC_CAC.nsf/files/2013-Austausch_B >, retrieved on Feb. 4, 2014.
(Continued)

*Primary Examiner* — Shamim Ahmed
*Assistant Examiner* — Bradford M Gates
(74) *Attorney, Agent, or Firm* — HPI Patent Department

(57) ABSTRACT

A surface finishing method comprises applying coatings of a hydrophobic material and a water-borne material to a surface of a metal substrate. First, a patterned coating of a first one of the hydrophobic or water-borne materials is applied to a surface of the metal substrate to partially cover the surface. A second fill coating of the other of the hydrophobic or water borne materials is then applied after the first patterned coating whereby the water borne material and the hydrophobic material repel and the second fill coating coats the surface of the metal substrate in areas uncoated by the first coating.

11 Claims, 3 Drawing Sheets

(51) Int. Cl.

| | |
|---|---|
| ***B05D 1/36*** | (2006.01) |
| ***B44F 9/10*** | (2006.01) |
| *B05D 1/32* | (2006.01) |

(52) U.S. Cl.

CPC .................. *B44F 9/10* (2013.01); *B05D 1/32* (2013.01); *B05D 2202/00* (2013.01)

(56) References Cited

U.S. PATENT DOCUMENTS

| | | | | |
|---|---|---|---|---|
| 7,985,790 | B2 | 7/2011 | Polastri et al. | |
| 2004/0009303 | A1* | 1/2004 | Ito ....................... | H01L 27/3246 313/483 |
| 2010/0104884 | A1 | 4/2010 | Bloom et al. | |
| 2010/0143741 | A1 | 6/2010 | Bell et al. | |
| 2012/0009340 | A1 | 1/2012 | Sepeur et al. | |
| 2012/0038863 | A1* | 2/2012 | Matsui ................... | G02B 5/201 349/106 |
| 2012/0121929 | A1 | 5/2012 | Smith et al. | |
| 2012/0287380 | A1* | 11/2012 | Hagiwara .............. | G02B 5/201 349/97 |
| 2013/0044384 | A1* | 2/2013 | Kim ......................... | B05D 5/06 359/885 |

FOREIGN PATENT DOCUMENTS

| | | | |
|---|---|---|---|
| TW | 201016801 | A1 | 5/2010 |
| TW | 201309479 | A1 | 3/2013 |
| WO | WO-2006-108655 | | 10/2006 |
| WO | WO-2013090398 | | 1/2013 |

OTHER PUBLICATIONS

Darden et al.; "New Technology Coatings for Corrosion Contro : New Waterborne Fluoropolymer Resins for Ultra . . . ", <http://www.paintsquare.com/store/assets/JP.

* cited by examiner

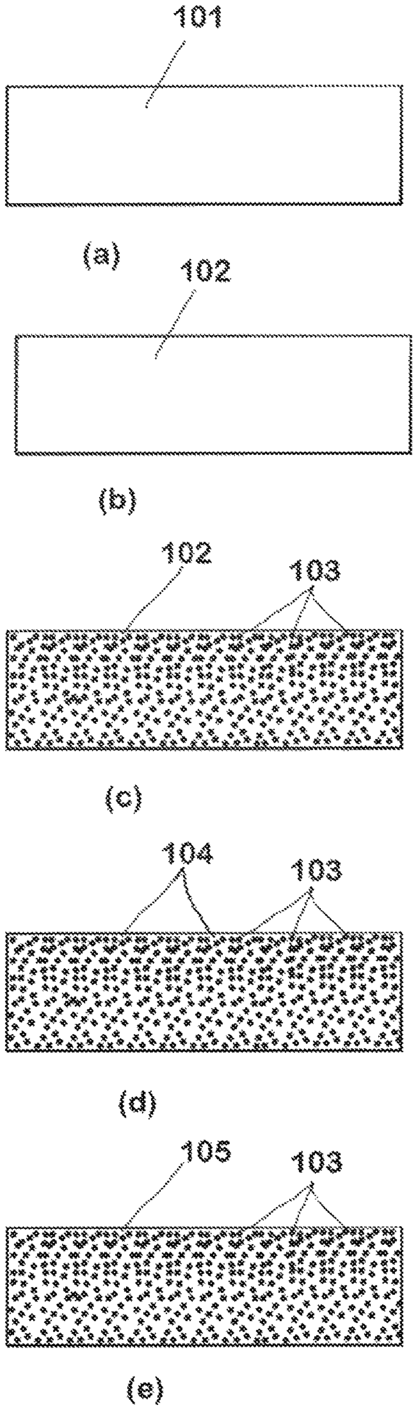
Figure 1 (a) - (e)
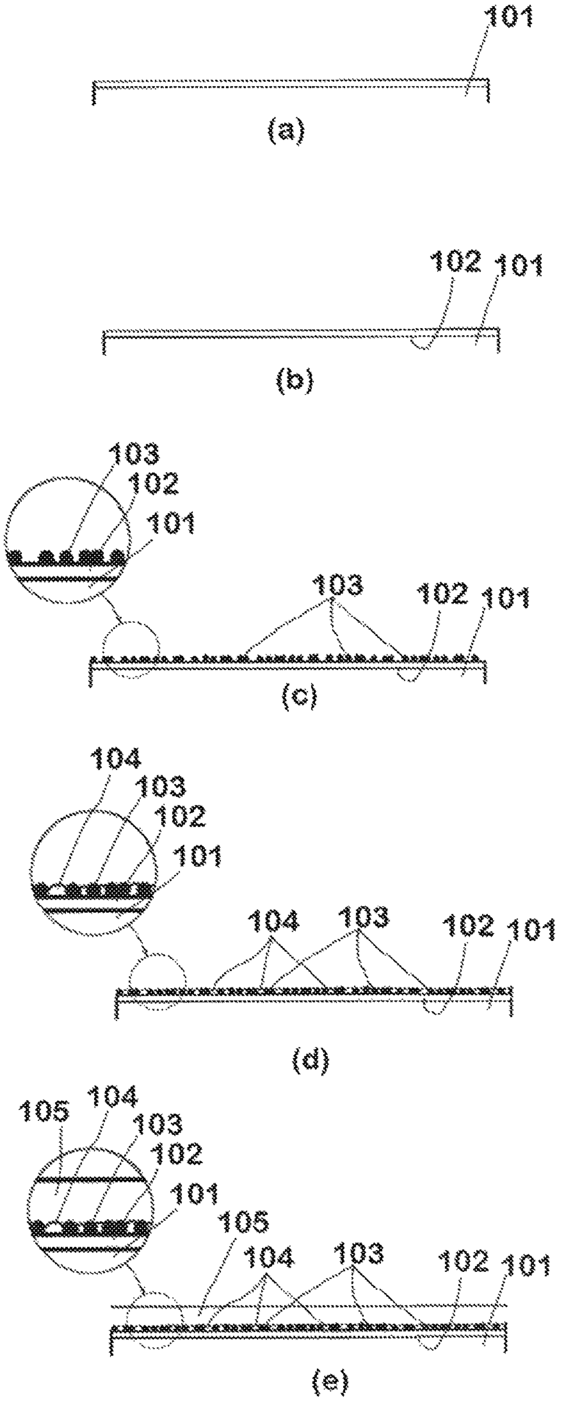
Figure 2 (a) - (e)

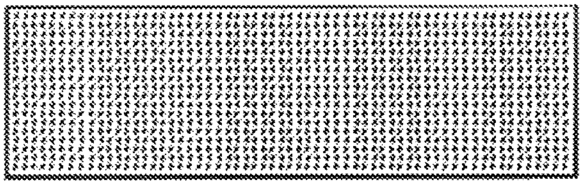
(a)
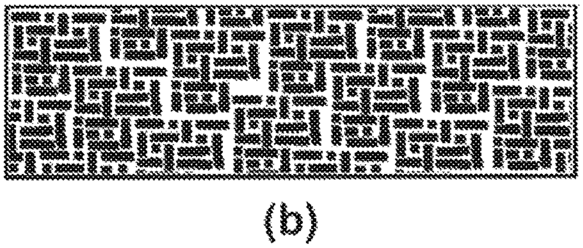
(b)
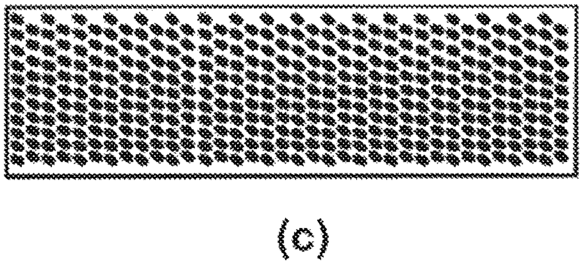
(c)
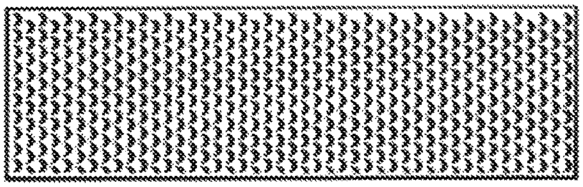
(d)
Figures 4(a)-(d)

FINISHING METHOD FOR A METAL SURFACE

BACKGROUND

Computers Mobile phones and other devices and equipment are often housed in metal housings or housings having at least some metal surfaces, which are generally protected by a surface coating. A surface finish which may be used on such devices or equipment is a metallic luster finish. However care is required to achieve a metallic luster appearance which shows the original metallic luster of the substrate surface and hides defects in the surface of the metal substrate when coating the surface using a painting process.

BRIEF DESCRIPTION OF DRAWINGS

Examples of surface finishing methods will be described with reference to the accompanying drawings in which:

FIG. 1 (*a*)-(*e*) illustrate top views of the product at various stages in the surface finishing process;

FIG. 2 (*a*)-(*e*) illustrate side views of the product at various stages in the surface finishing process corresponding to the respective top views in FIG. 1 (*a*)-(*e*);

FIG. 4 (*a*)-(*d*) illustrate possible variations in the shape of the patterns of a first patterned coating.

DETAILED DESCRIPTION

Figure 3:
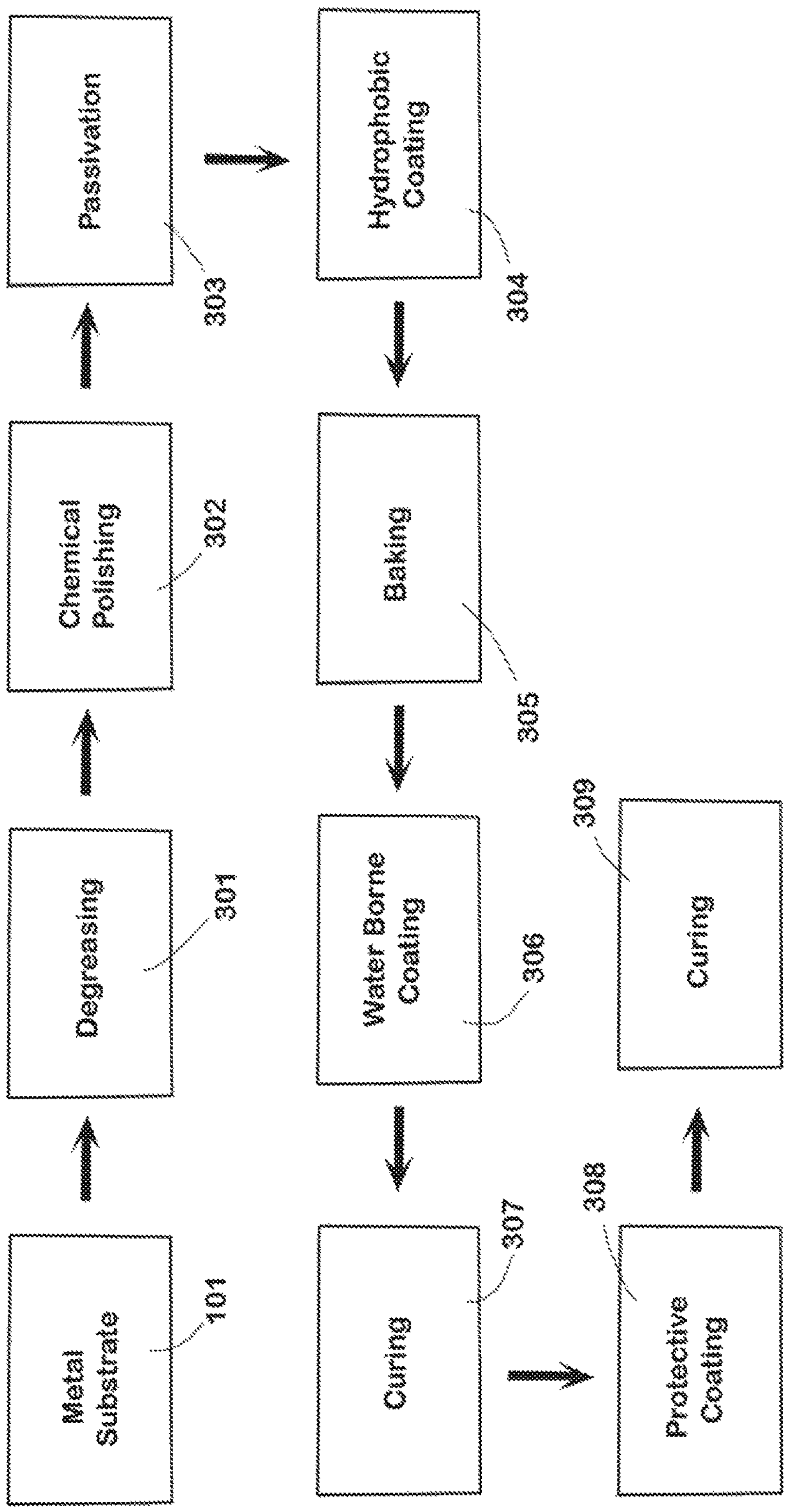
FIG. 3 illustrates a production flow diagram.

Coatings may be used on metallic surfaces to protect the surface and provide a metallic luster appearance. Such coatings may also provide a blemish free finish, which may hide surface defects in the surface of the metallic substrate. The present process can achieve a metallic luster appearance by using a two-step process of applying a coatings of a hydrophobic material and a water-borne material comprising applying a first patterned coating of one of the materials and subsequently applying a second fill coating of the other material which is repelled by the first coating, such that the surface of the first coating will not be coated by the second coating.

The hydrophobic coating may be the first coating to be applied, in which case it may be patterned and the water borne coating may be used to fill the pattern. Alternatively, the water borne coating may be patterned as the first coating and the hydrophobic coating may be used to fill the pattern. The first coating may also be a micro/nano patterned coating.

The hydrophobic coating may be a transparent, translucent or opaque coating. The hydrophobic coating may be a fluoropolymer coating selected from fluorinated olefin-based polymers, specialty fluoroacrylates, fluorosilicone acrylates, fluorourethanes, perfluoropolyethers/perfluoropolyoxetanes, fluorotelomers (C-6 or lower products), polytetrafluoroethylene (PTFE), polyvinylidenefluouride (PVDF), fluorosiloxane, fluoro UV polymers and hydrophobic polymers (C-7 or longer).

The material used for the water-borne coating may be selected from water borne epoxy, acrylic-epoxy hybrids, acrylics, polyurethane dispersions and water borne polymers (including water borne UV polymers).

Referring to FIGS. 1, 2, 3 & 4, an example method of finishing a surface of a metal substrate, such as a magnesium lithium (MgLi) alloy, or other metallic surface, may comprise the following steps:

a) The surface of the metal substrate 101 is first degreased 301;

b) The degreased surface of the metal substrate 101 is then chemically polished 302;

c) After the polishing step 302, the surface of the metal substrate 101 is subsequently passivated 303 to form a surface passivation layer 102;

d) A patterned coating of hydrophobic material 103 is then coated 304 onto the passivated surface 102;

e) The hydrophobic coating 103 is then baked 305;

f) A water borne coating material 104 is then coated 306 onto the passivated surface 102 to cover areas not coated by the hydrophobic coating 103;

g) The hydrophobic and water borne coatings 103 & 104 are then cured 307;

h) A protective coating or protective film is applied 308 over the cured hydrophobic and water based coatings.

i) The protective coating is then cured 309;

While the description above is for a process in which application of a patterned hydrophobic coating 103 is followed by application of a water borne coating 104 it will be appreciated that the first coating could be a water borne coating followed by a hydrophobic coating.

Amongst other materials, the substrate may be selected from aluminium, magnesium, titanium, lithium, zinc, niobium, or an alloy of one or more of these metals.

The degreasing step may be performed with alkaline solution with or without surfactants.

The polishing step may be a sandblasting, buffing, chemical or chemical mechanical polishing (CMP) step.

The passivation step may comprise applying one or more thin layers of aluminum zinc phosphate, calcium zinc molybdate, zinc molybdate phosphate, calcium borosilicate or strontium phosphosilicate, phosphates, manganese salts, manganese phosphate, calcium phosphate, zinc phosphate, vanadium, stannates, zirconates, etc.

The hydrophobic coating 103 may be a transparent, translucent or opaque micro/nano patterned fluoropolymer coating and may be selected from fluorinated olefin-based polymers, specialty fluoroacrylates, fluorosilicone acrylates, fluorourethanes, perfluoropolyethers/perfluoropolyoxetanes, fluorotelomers (C-6 or lower products), polytetrafluoroethylene (PTFE), polyvinylidenefluouride (PVDF), fluorosiloxane, fluoro UV polymers and hydrophobic polymers (C-7 or longer). The thickness of the hydrophobic coating 103 may be in the range of 1-100 um and generally in the range of 5-30 um. The spots in the pattern of the hydrophobic coating may be in the range of 3 nm to 30 μm across and may cover up to 40% of the area of the metallic substrate surface.

The hydrophobic coating 103 may be applied by inkjet printing, screen printing, 3D printing or spray drying.

The material used for the water-borne coating 104 may be selected from water borne epoxy, acrylic-epoxy hybrids, acrylics, polyurethane dispersions and water borne polymers. The thickness of the water-borne coating 104 may also be in the range of 1-100 μm and generally in the range of 5-30 μm and it will generally cover the surface of the metallic substrate not covered by the hydrophobic coating.

The material used for the water-borne coating may be applied by flow coating, spraying, screen printing or inkjet printing.

The protective coating may be applied using a process selected from coating, or film transfer and may include one of in-mould decoration, out-side mould decoration, in-mould film, in-mould label, release film and nano-imprint lithography.

The baking temperature of first coating is in the range of 60-120° C. for 30-60 minutes. The curing of the hydrophobic, water borne and protective coatings may be performed at a temperature in the range of 120-180° C. for 30-120 minutes. For UV polymers, the curing may be performed under UV exposure for less than 3 minutes and preferably in the range of 15-30 seconds.

The protective coating may be a combination of polyacrylic resin and a fluoropolymer such as fluorosiloxane applied by flow coating, spraying, screen printing or inkjet printing. The protective coating or film may be applied with a thickness in the range of 1-50 μm and preferably in the range of 5-30 μm.

Surface treatment methods of the type described above may be used to reduce or eliminate defect issue induced by substrate defects.

This surface treatment method may employ patterns in the hydrophobic material coating or the water borne material coating which have spot shapes including Circles (see FIG. 1), Triangle (see FIG. 4(*a*)), Squares, Rectangles or Trapezoids, (see FIG. 4(*b*)), Ovals (see FIG. 4(*c*)), Crescents (see FIG. 4(*d*)), logos or any other shape including random shapes or combinations of any or all of these. The shapes may be applied in regular patterns created by masking or controlling an output of a print head spatially, or may be more random if applied by methods such as unmasked spraying of droplets.

The degree of metallic appearance may be created and controlled by the selection of the size and numbers of micro and nano coating spots and the color performance of water-borne or hydrophobic coatings.

The coating process may be used to enable the achievement of a metallic luster appearance allowing the original metallic luster from the substrate surface to show through.

The coating process may also reduce or eliminate the visibility of surface defects induced by substrate defects.

In one example, a surface finishing method in which a coatings of a hydrophobic material and a water-borne material are applied to a surface of a metal substrate includes i) applying a first patterned coating of one of the hydrophobic or water-borne materials to the surface of the metal substrate, the coating being applied in a pattern to partially cover the surface; and ii) applying a second fill coating of the other of the hydrophobic or water borne materials after the first coating whereby the second fill coating is repelled by the first coating and coats the surface of the metal substrate in areas uncoated by the first coating. The surface finishing method can include applying a water-borne coating as the first coating and applying a hydrophobic coating as the second coating.

In another example, a second surface finishing method of the present disclosure includes i) applying a first coating of hydrophobic material to a surface of a metal substrate, the coating being applied in a pattern to partially cover the surface; and ii) applying a second fill coating of a water-borne material after the coating of hydrophobic material whereby the water-borne material is repelled by the hydrophobic material and coats the surface of the metal substrate in areas uncoated by the hydrophobic material.

The surface finishing methods can include applying the first coating in a pattern having a plurality of areas each of a width of in the range of 3 nm to 30 μm; applying the first coating material in a pattern covering up to 40% of the surface of the metallic substrate; and/or baking of the substrate after the first coating is applied and before the second coating is applied and a curing of the coatings of hydrophobic material and water-borne material after the second coating is applied. In the baking example, the surface finishing method can include applying a protective coating over the cured coatings of hydrophobic material and water-borne fill material, such as by a coating process or a film transfer process.

In another example, a housing includes at least one metallic surface, the metallic surface forming a metallic substrate surface for a surface finish. The finish surface in this example includes i) a patterned layer of fluoropolymer material patterned to partially covers the substrate surface; and ii) a patterned layer of a second material, which is different to the fluoropolymer material, located over the substrate surface in areas not covered by the patterned layer of fluoropolymer material. The substrate can be selected from aluminium, magnesium, titanium, lithium, zinc, niobium, or an alloy of one or more of these metals. The patterned layer of fluoropolymer material can be a micro/nano patterned fluoropolymer coating which has been cured. The fluoropolymer material can be selected from fluorinated olefin-based polymers, fluoroacrylates, fluorosilicone acrylates, fluorourethanes, perfluoropolyethers/perfluoropolyoxetanes, fluorotelomers (C-6 or lower), polytetrafluoroethylene (PTFE), polyvinylidenefluouride (PVDF), fluorosiloxane, fluoro UV polymers or hydrophobic polymers (C-7 or longer. In another example, the second material can be selected from water-borne epoxy, acrylic-epoxy hybrids, acrylics, polyurethane dispersions and water-borne polymers. The protective layer can be located over the patterned layer of fluoropolymer material and the second material. The protective layer can include a material selected from fluorinated olefin-based polymers, fluoroacrylates, fluorosilicone acrylates, fluorourethanes, perfluoropolyethers/perfluoropolyoxetanes, fluorotelomers (C-6 or lower), polytetrafluoroethylene (PTFE), polyvinylidenefluouride (PVDF), fluorosiloxane, fluoro UV polymers, hydrophobic polymers (C-7 or longer), water-borne epoxy, acrylic-epoxy hybrids, acrylics, polyurethane dispersions, water-borne polymers (including UV polymers) or a combination of two or more of these.

The invention claimed is:

1. A surface finishing method comprising:

i) applying a first patterned coating including a hydrophobic material or a water-borne material to a surface of a metal substrate in a pattern that partially covers the surface of the metal substrate; and ii) applying a second fill coating of the other of the hydrophobic material or the water-borne material after applying the first patterned coating, wherein the second fill coating is repelled by the first patterned coating and coats the surface of the metal substrate in areas uncoated by the first patterned coating, wherein the metal substrate is a housing for a device and the surface finishing of the housing applies a surface finish that allows a metallic luster of the metal substrate to show through.

2. The method of claim 1, wherein the first patterned coating e water-borne coating and the second fill coating is the hydrophobic coating.

3. A housing comprising:

at least one metallic surface; the metallic surface forming a metallic substrate surface; and a surface finish comprising:

i) a patterned layer of a fluoropolymer material that partially covers the at least one metallic surface wherein the fluoropolymer material is a transparent, translucent or opaque micro- or nano-patterned fluoropolymer coating to allow metallic luster from the at least one metallic surface to show through, and ii) a patterned layer of a second material, which is different than the fluoropolymer material, located over the metal surface in areas not covered by the patterned layer of the fluoropolymer material.

4. The housing of claim 3 wherein, the metallic surface of the substrate is selected from aluminium, magnesium, titanium, lithium, zinc, niobium, or an alloy of one or more of these metals.

5. The housing of claim 3 wherein, the patterned layer of the fluoropolymer material is cured.

6. The housing of claim 3 wherein, the fluoropolymer material is selected from fluorinated olefin-based polymer, fluoroacrylate, fluorosilicone acrylate, fluorourethane, perfluoropolyether/perfluoropolyoxetane, fluorotelomer, polytetrafluoroethylene (PTFE), polyvinylidenefluouride (PVDF), fluorosiloxane, fluoro UV polymer, or hydrophobic polymer.

7. The housing of claim 3 wherein the second material is selected from water-borne epoxy, acrylic-epoxy hybrid, acrylic, polyurethane dispersion, and water-borne polymer.

8. The housing of claim 3 further comprising a protective layer located over the patterned layer of the fluoropolymer material and the patterned layer of the second material.

9. The housing of claim 8, wherein the protective layer comprises a material selected from a fluorinated olefin-based polymer, fluoroacrylate, fluorosilicone acrylate, fluorourethane, perfluoropolyether/perfluoropolyoxetane, fluorotelomer, polytetrafluoroethylene (PTFE), polyvinylidenefluouride (PVDF), fluorosiloxane, fluoro UV polymer, hydrophobic polymer, water-borne epoxy, acrylic-epoxy hybrid, acrylic, polyurethane dispersion, water-borne polymer, or a combination of two or more of these.

10. The housing of claim 3, wherein the fluoropolymer material is fluorosiloxane and the second material is a polyacrylic resin.

11. The housing of claim 10, wherein the patterned layer of the fluoropolymer material and the patterned layer of the second material collectively form a coating on the at least one metallic surface and the coating has a thickness ranging from 5 μm to 30 μm.

* * * * *